March 31, 1936.                E. ZINGG                2,035,856
                DOUBLE ACTING INTERNAL COMBUSTION ENGINE
                          Filed Dec. 22, 1932
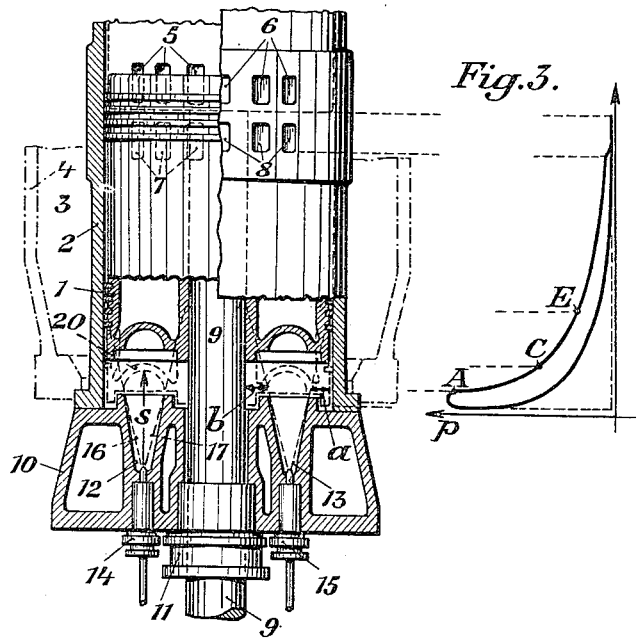
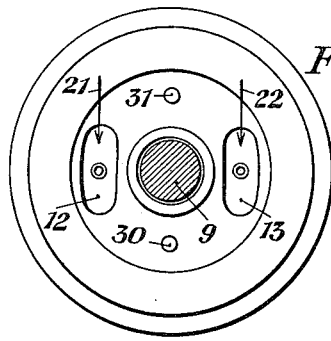
INVENTOR:
Ernst Zingg,
BY
Pennie Davis Marvin & Edmonds
ATTORNEY.

Patented Mar. 31, 1936

2,035,856

UNITED STATES PATENT OFFICE 2,035,856

DOUBLE-ACTING INTERNAL COMBUSTION ENGINE

Ernst Zingg, Winterthur, Switzerland, assignor to the firm of Sulzer Fréres Société Anonyme, Winterthur, Switzerland Application December 22, 1932, Serial No. 648,406 In Switzerland December 24, 1931

11 Claims. (Cl. 123—32)

This invention relates to double-acting internal combustion engines with airless or solid injection of fuel and of the kind wherein the injection of fuel into that working chamber traversed by the piston rod takes place through injection chambers or pockets arranged in the cylinder head or cover through which the piston rod passes.

When in engines of this general type the introduction of fuel to the working chamber traversed by the piston rod takes place in a direction chiefly at right angles to the longitudinal axis of the cylinder and either radially or tangentially with respect thereto, the piston rod and inner surface of the cylinder are liable to be damaged due to burning, more particularly when one or more of the injection apertures or nozzles become partially clogged so as to cause the fuel jet to diverge from the normal or intended direction. Again, when the fuel injection chambers are disposed outside the limits of the cylinder bore, that is to say at a distance from the cylinder axis exceeding the internal radius of the cylinder, the fuel jets must necessarily be directed inwards so that during combustion the piston rod is subjected to the direct action of the flame at the maximum temperature.

In such an arrangement therefore the dimensions of the cylinder cover are increased by reason of the injection chambers and, in addition, separate provision has to be made for scavenging these chambers whilst the tendency for the piston rod to be damaged by burning is not overcome. The present invention has for its object to provide an improved construction whereby the above difficulties will be overcome.

To this end according to the present invention the fuel injection chambers or pockets, provided in the cylinder cover through which the piston rod passes, are arranged within the geometrical projection of the cylinder bore, though not necessarily in between the ends of said cylinder, itself, and the mean direction of fuel flow from each nozzle throughout the injection chamber is towards the piston.

Preferably the arrangement and dimensions of the injection chambers or pockets so determine the outer limits of the fuel jet or stream delivered from each chamber that when injection is substantially complete such fuel jets will not have impinged directly on the piston rod or the inner surface of the cylinder. Each injection chamber or pocket may be widened so as to form an elongated mouth, the mean maximum dimension of which in a plane normal to the cylinder axis lies in the mean direction of flow of the scavenging air in a similar plane through the air admission ports.

One construction according to the present invention is illustrated somewhat diagrammatically and by way of example in the accompanying drawing, in which Figure 1 is a section, partly in elevation, of the engine cylinder, Figure 2 illustrates in plan the lower cylinder cover included in Figure 1, and Figure 3 is a pressure-volume diagram in respect of the lower working chamber.

In the construction illustrated the double-acting piston 1 is arranged to reciprocate within a cylinder liner 2 which is furnished with a cooling space 3 formed between the liner and an outer casing, part of which is indicated at 4. The upper working chamber is provided with air inlet ports 5 and exhaust ports 6, whilst the lower working chamber has air inlet ports 7 and exhaust ports 8. The joint between the piston rod 9, which traverses the lower working chamber, and the lower cylinder head or cover 10 is sealed by means of a stuffing box 11.

Formed in the cylinder cover 10 are two fuel injection chambers or pockets 12 and 13 through which fuel, injected by injection nozzles 14 and 15, passes into the lower working chamber, injection into the restricted spaces further improving the combustion process. Each of the injection chambers 12 and 13, the shape of which may vary is so arranged within the limits of the cylinder bore, that is to say, inside the circle defining the inner periphery of the cylinder, or, at a distance from the cylinder axis less than the internal radius of the cylinder, that the outer boundary surface, indicated at 16 and 17 of each fuel jet (assuming this to be sprayed throughout the working chamber) does not come in contact with either the piston rod 9 or the inner surface of the liner 2 until injection is substantially complete. Thus, when expansion commences within the lower working chamber as indicated at A on the pressure-volume diagram shown in Figure 3, the outer boundary surface indicated at 16, of each fuel jet is located at a distance $a$ from the adjacent wall of the cylinder liner 2, whilst at the side of the piston rod the outer boundary surface indicated at 17, of each fuel jet is located at a distance $b$ from the adjacent surface of the piston rod 9. When, during the expansion stroke, the piston reaches the position indicated in full lines in Figure 1, i. e. the point C on the expansion curve, the outer boundary surface of each fuel jet is still remote both from the liner surface and from the piston rod. The outer boundary surface of each fuel jet does not come in contact with the surface of the liner and the piston rod until the piston has reached a position corresponding to the point E on the expansion curve, that is to say when injection is substantially complete and the temperature within the lower working chamber, having reached its maximum value, is decreasing.

The injection chambers 12 and 13, as shown, are so shaped that the longitudinal cross-section of each chamber is somewhat triangular, and the transverse cross-section is somewhat oval so as to form an elongated mouth which extends substantially parallel to the direction of flow of the scavenging air current at this part of the working chamber. Thus the air introduced through the admission ports 7 flows down the interior of the cylinder wall and across the injection chambers 12 and 13 as shown by the arrows 21 and 22 in Figure 2 thereby scavenging the injection chambers, the air and waste gases passing out through the exhaust ports 8. The cover 10 carries an air starting valve 30 and a safety valve 31.

The drawing shows the face of the piston 1 within the lower working chamber provided with two curved recesses. The distance s measured between each injection nozzle and the face of the piston at the central point of the recess 20 when the piston is in the lower dead centre position indicated by dotted lines in Figure 1, is greater than the length of penetration of the fuel jet, that is to say greater than the length of the path traversed by the fuel in the process of burning. When the piston is in the lower dead centre position, each recess registers with the elongated mouth of one of the injection chambers 12 and 13. Further, the lower face of the piston is so formed that when the piston is in its lower dead centre position there is only a slight clearance between the piston and the inner surfaces of the cover 10 in which are arranged the starting valve 30 and safety valve 31.

Thus, shortly before fuel is injected into the injection chambers 12 and 13 the air between the lower face of the piston and the inner face of the cover 10 is displaced into the chambers 12 and 13 in a direction opposite to that in which fuel is injected from the injection nozzles. In this way an air space enclosed by one of the injection chambers and the cooperating recess 20 is provided above each injection nozzle so that each fuel jet is injected in the form of a flat fan-like stream on to the curved surface of the cooperating recess in the piston whereby the fuel is caused to eddy and thus promote effective combustion. Further, when injection commences each fuel jet is enclosed by the surfaces on the lower face of the piston and on the cylinder cover so that from the beginning of the firing stroke until injection is substantially complete both the cylinder wall and the piston rod are protected from damage due to direct action of the flame at its highest temperature.

Arrangement of the fuel injection chambers within the limits of the cylinder bore so that the mean direction of each fuel jet is substantially parallel to the longitudinal axis of the cylinder results in the further advantage that the length of each jet is not limited by the inner surface of the cylinder as, for example, in arrangements which employ jets directed into the working chamber at an angle to the length of the piston rod.

It will be understood that details of construction may be varied without departing from the spirit of the invention. Thus instead of arranging the exhaust ports opposite to the inlet ports as in the construction illustrated, the exhaust ports may be arranged in a plane above or below the inlet ports. If desired more than one nozzle, each of a different diameter, may be provided for each of the injection chambers, so that a jet or fuel stream having the form or dimensions suited to the particular dimensions or shape of the injection chamber may be obtained. Further, with a view to allowing for expansion of the lower cylinder cover at that part thereof surrounding each injection chamber the part immediately adjacent to each nozzle may project from the outer surface of the cover and may be sealed from the cooling jacket of the cover by means of a stuffing box.

What is claimed is:

1. In an internal combustion engine, a cylinder, a cover therefor, a piston rod extending through said cover, a fuel injection chamber arranged in said cover and being completely located within the space defined by the internal circumference of said cylinder and the surface of said rod, the longitudinal axis of said chamber being disposed substantially parallel to the axis of said piston rod.

2. In an internal combustion engine, a cylinder, a cover therefor, a piston rod extending through said cover, a fuel injection chamber having divergent walls arranged in said cover and being completely located within the space defined by the internal circumference of said cylinder and the surface of said rod, the axis of said chamber being disposed substantially parallel to the axis of said piston rod.

3. In an internal combustion engine, a cylinder, a cover therefor having an annular projection projecting into the cylinder, a piston having a face facing said cover and a recess in said face registering with said projection, a piston rod connected to said piston and extending through said cover, a fuel injection chamber arranged in said cover, said chamber extending through said annular projection and having its longitudinal axis substantially parallel to the axis of said piston rod.

4. In an internal combustion engine, a cylinder, a cover therefor having an annular projection projecting into said cylinder, a piston having a face facing said cover and a recess in said face registering with said projection, a piston rod connected to said piston and extending through said cover, a plurality of fuel injection chambers arranged in said cover, said chambers extending through said annular projection and having their longitudinal axes substantially parallel to the axis of said piston rod, said piston having cavities extending from said recess into the piston and being located opposite said injection chambers.

5. In an internal combustion engine, a cylinder having an internal wall, a cylinder cover, a piston rod extending through said cover, a fuel injection chamber arranged in said cover, the longitudinal axis of said chamber being substantially parallel to the axis of said piston, said chamber having an elongated opening connecting said chamber with the interior of said cylinder, and the walls of said opening being spaced from said piston rod and from the wall of the cylinder and preventing the fuel from contacting with the piston rod and the cylinder wall.

6. In an internal combustion engine, a cylinder having an internal wall, a cylinder cover, a piston rod extending through said cover, at least two fuel injection chambers in said cover, the longitudinal axes of said chambers being substantially parallel to the axis of said piston rod, said chambers each having walls diverging from the longitudinal axis thereof and forming an inverted cone, the intersections of the imaginarily elongated surfaces of which cones, with the interior wall of said cylinder and the surface of the piston rod, are remote from said cover, whereby the fuel and flame body emanating from said chambers into the interior of said cylinder is substantially parallel to the axis of said cylinder and substantially clear from said piston rod and the wall of said cylinder.

7. In an internal combustion engine, a cylinder having an interior wall, a cylinder cover, a piston rod extending through said cover, a fuel injection chamber arranged in said cover, and having a longitudinal axis which is substantially parallel to said piston rod, said chamber having walls diverging at different angles from said longitudinal axis and forming a flattened cone of substantially elliptic cross section, the shorter axis of which is radial with respect to the axis of said piston rod, said walls, if imaginarily elongated into the interior of said cylinder, intersecting with the interior wall of said cylinder and the surface of said rod remotely from said cover, whereby the fuel and flame body emanating from said chamber into the interior of said cylinder is substantially parallel to the axis of said cylinder and substantially clear of said piston rod and the walls of said cylinder.

8. In an internal combustion engine, a cylinder having an interior wall, a cylinder cover, a piston rod extending through said cover, a fuel injection chamber arranged in said cover and having a longitudinal axis which is substantially parallel to said piston rod, said chamber having walls diverging at different angles from said longitudinal axis and forming a flattened cone of kidney-shaped cross sectional configuration which twines around said rod, said walls if imaginarily elongated into the interior of said cylinder, intersecting with the interior wall of said cylinder and surface of said rod remotely from said cover, whereby the fuel and flame body emanating from said chamber into the interior of said cylinder is substantially parallel to the axis of said cylinder and substantially clear of said piston rod and the walls of said cylinder.

9. In an internal combustion engine, a cylinder having an interior wall, a cylinder cover, a piston rod extending through said cover, a fuel injection chamber arranged in said cover and being completely located within the space defined by the internal circumference of said cylinder and the surface of said rod, the longitudinal axis of said chamber being substantially parallel to the axis of said piston, said chamber having an elongated opening connecting said chamber with the interior of said cylinder, said opening being spaced from said piston rod and from the interior wall of said cylinder.

10. In an internal combustion engine, a cylinder, a cover therefor, a piston having a face facing said cover, a piston rod connected to said piston and extending through said cover, a plurality of fuel injection chambers arranged in said cover, said chambers having their longitudinal axes substantially parallel to the axis of said piston rod, and said piston having cavities in said face located opposite said injection chambers.

11. In an internal combustion engine, a cylinder, a cover therefor having an interior face substantially normal to the axis of the cylinder, a piston having a face substantially normal to the axis of the cylinder, a piston rod extending through said cover, a fuel injection nozzle whose axis of injection is substantially normal to the face of the piston, and a fuel injection chamber surrounding the nozzle, the mouth of said chamber being spaced from the cylinder wall and from the piston rod and the walls of the chamber serving to guide the spreading fuel spray and flame body and thus protect the cylinder walls and piston rod against burning.

ERNST ZINGG.